(12) United States Patent
Govindarajan et al.

(10) Patent No.: US 11,243,945 B2
(45) Date of Patent: Feb. 8, 2022

(54) DISTRIBUTED DATABASE HAVING BLOCKCHAIN ATTRIBUTES

(71) Applicant: International Business Machines Corporation, Armonk, NY (US)

(72) Inventors: Chander Govindarajan, Bangalore (IN); Praveen Jayachandran, Bangalore (IN); Senthilnathan Natarajan, Bangalore (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 15/837,456

(22) Filed: Dec. 11, 2017

(65) Prior Publication Data
US 2019/0179939 A1     Jun. 13, 2019

(51) Int. Cl.
G06F 16/242     (2019.01)
G06F 11/34      (2006.01)
G06F 16/27      (2019.01)
H04L 9/32       (2006.01)

(52) U.S. Cl.
CPC ...... *G06F 16/2445* (2019.01); *G06F 11/3476* (2013.01); *G06F 16/27* (2019.01); *H04L 9/3239* (2013.01); *H04L 2209/38* (2013.01)

(58) Field of Classification Search
CPC .. G06F 16/2445; G06F 16/27; G06F 11/3476; G06F 11/1474; G06F 16/2358; G06F 16/2315; H04L 9/3239; H04L 2209/38
See application file for complete search history.

(56) References Cited

U.S. PATENT DOCUMENTS

| 7,801,846 B2* | 9/2010 | Devine ............... G06F 16/2343 707/609 |
| 9,774,578 B1* | 9/2017 | Ateniese ............... H04L 9/3226 |
| 2003/0004930 A1* | 1/2003 | Minder ............... G06F 16/2438 |
| 2009/0138531 A1* | 5/2009 | Horii ....................... G06F 9/466 |

(Continued)

FOREIGN PATENT DOCUMENTS

WO     2017109140 A1     6/2017

OTHER PUBLICATIONS

Alan Fekete (Making Snapshot Isolation Serilizable) vol. 30, No. 2, Jun. 2005, pp. 492-528. (Year: 2005).*

(Continued)

*Primary Examiner* — Ashish Thomas
*Assistant Examiner* — Yohanes D Kelemework

(57) ABSTRACT

An example operation may include one or more of a processor configured to receive a database command from a client system, the database command comprising a database function and parameters to be used by the database function, and to execute the database command on database data, and an interface configured to transmit the database command to one or more other databases that are within a decentralized database system in which each database node is controlled by a different entity, wherein in response to receiving a request from an ordering node of the decentralized database system, the processor may commit results of executing the database command to a database and store information about the database command in an append-only immutable database log.

21 Claims, 6 Drawing Sheets

(56) References Cited

U.S. PATENT DOCUMENTS

| | | | |
|---|---|---|---|
| 2013/0304714 A1* | 11/2013 | Lee ..................... | G06F 9/466 |
| | | | 707/703 |
| 2016/0306709 A1* | 10/2016 | Shaull ................ | G06F 11/1458 |
| 2017/0083907 A1 | 3/2017 | McDonough et al. | |
| 2017/0177855 A1* | 6/2017 | Costa Faidella ...... | H04L 9/3236 |
| 2017/0230189 A1 | 8/2017 | Toll et al. | |
| 2017/0344580 A1* | 11/2017 | King ..................... | G06F 16/137 |
| 2017/0344987 A1* | 11/2017 | Davis ..................... | H04L 9/30 |
| 2017/0366353 A1* | 12/2017 | Struttmann ............ | G06F 21/64 |
| 2018/0005186 A1* | 1/2018 | Hunn .................... | G06F 40/103 |

OTHER PUBLICATIONS

Fekete (Making Snapshot Isolatio Serializable) ACM Transactions on Database Systems, vol. 30, No. 2, Jun. 2005.*
IBM; Making Blockchain Real for Business, V3.4, Sep. 2016.
James Smith et al., Applying Blockchain Technology in Global Data Infrastructure, ODI Labs; 2016.
Anonymously; Blockchain Transaction Index Mechanism, IP.COM, Mar. 2, 2017.
Anonymously; Verification of the Temporal Synchronization Between Like Database Objects Across Two or More Concurrent, but Discrete, Systems, IP.COM, Jan. 9, 2014.

* cited by examiner

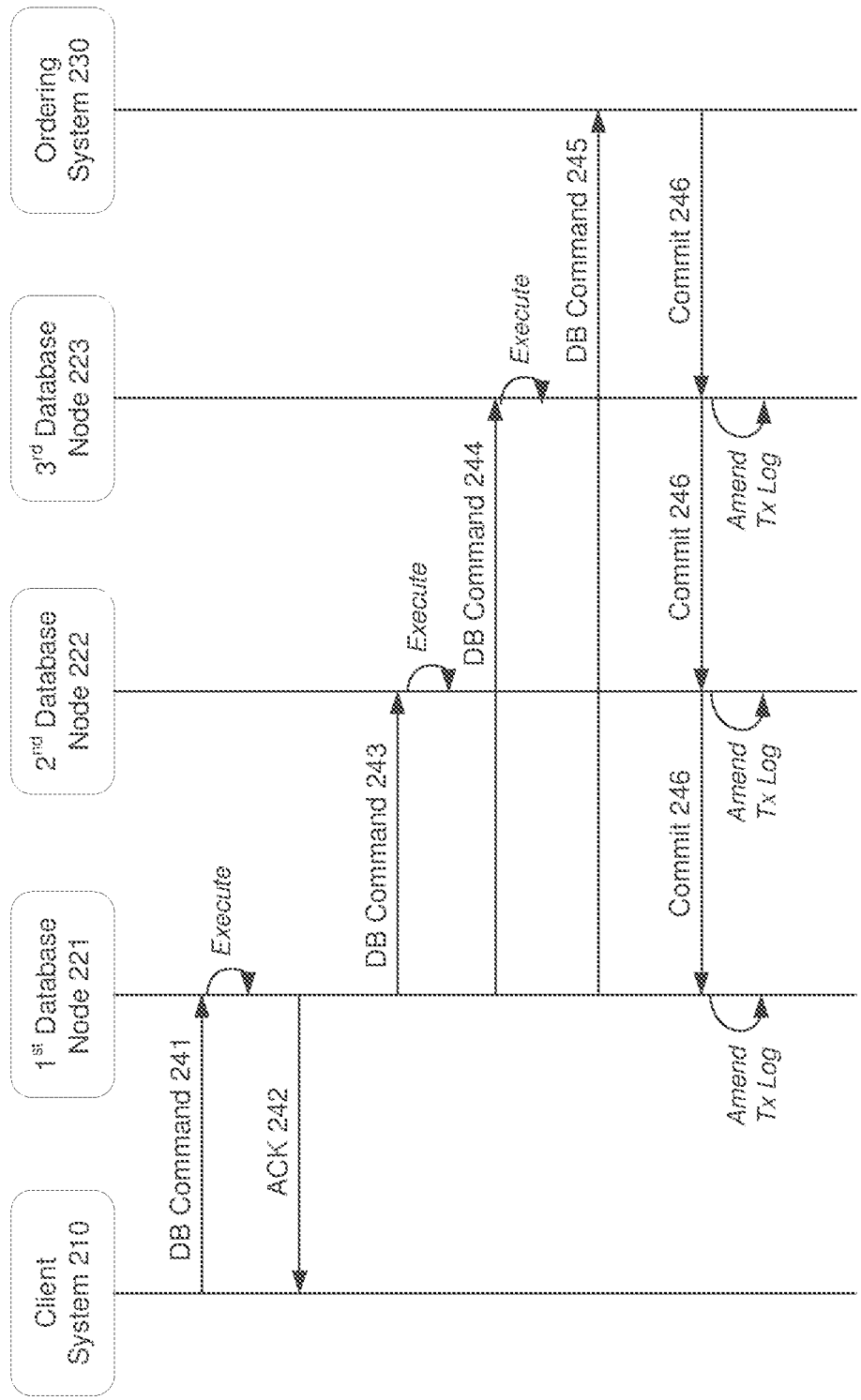

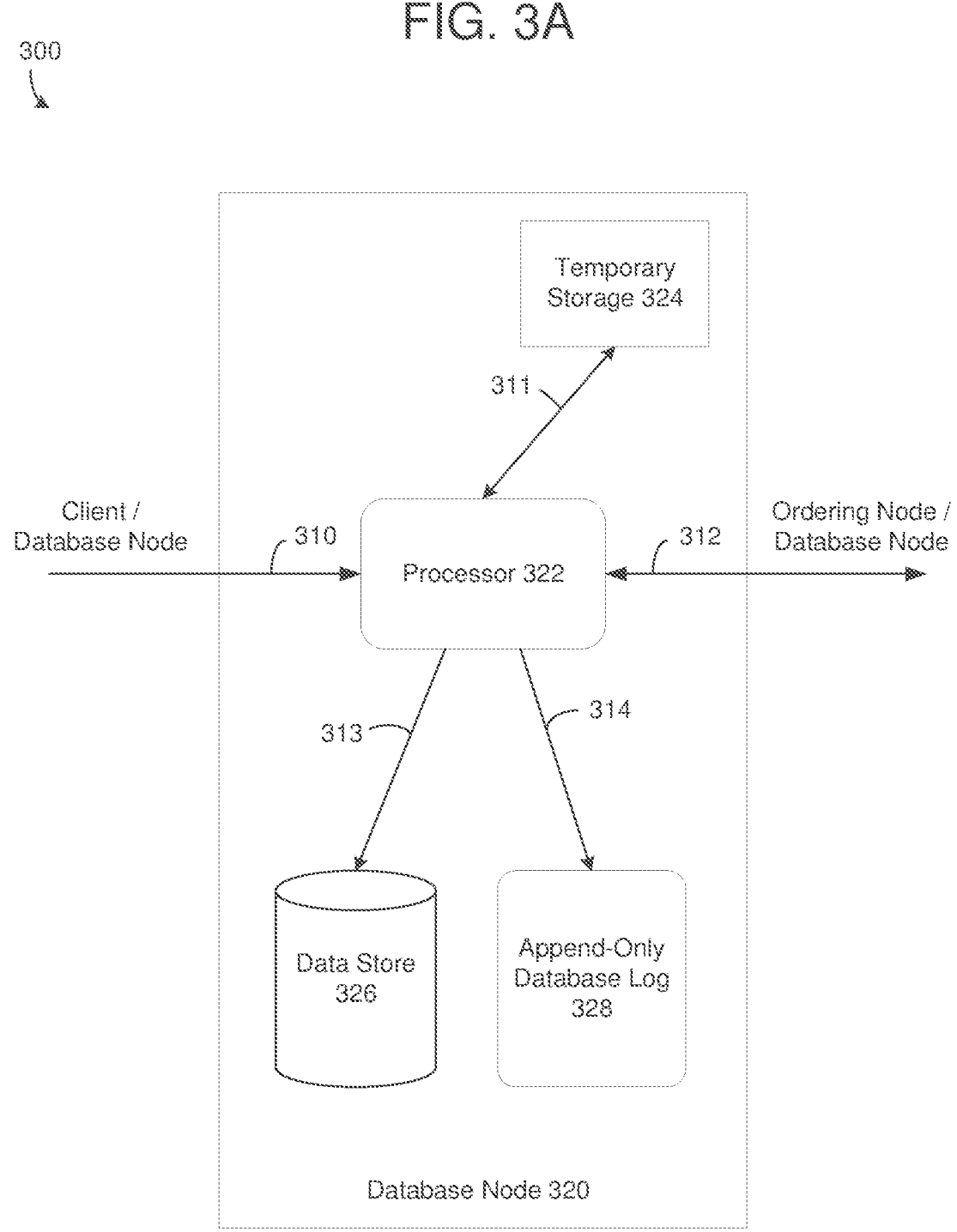

DISTRIBUTED DATABASE HAVING BLOCKCHAIN ATTRIBUTES

TECHNICAL FIELD

This application generally relates to a database system and more particularly, to a distributed database having blockchain attributes.

BACKGROUND

A blockchain may be used as a public ledger (or private ledger) to store transactional information regarding the exchange of assets (e.g., monetary, goods, services, etc.) Asset-based exchanges are executed within a blockchain when it is determined that certain conditions are satisfied. The results of the transaction are stored in a blockchain ledger which is replicated (i.e., distributed) across multiple blockchain nodes. Because any individual or entity can provide information to a public blockchain, this information should be reviewed and confirmed. This review operation is known as consensus. Blockchain systems typically rely on a decentralized consensus which transfers authority and trust to a decentralized network and enables its nodes (i.e., blockchain peers) to continuously and sequentially record their transactions on a public "block", creating a unique "chain" referred to as a blockchain. Cryptography, via hash codes, is used with a blockchain to secure an authentication of a transaction source and removes the need for a central intermediary.

Meanwhile, a distributed database system is a database in which storage devices are not all controlled by the same processor. For example, the distributed database system may be stored in multiple distinct computing systems location in the same physical location or dispersed over a network of interconnected computers. Because Distributed databases store data across multiple computers, distributed databases may improve performance at end-user worksites by allowing transactions to be processed on many machines, instead of being limited to one. To ensure that the different databases remain current with one another, the distributed database applies duplication. To perform duplication, the system identifies one database as a master and then duplicates the contents of that database with the other slave databases. The duplication process is normally done at a set time after hours. This is to ensure that each distributed location has the same data. In the duplication process, users may change only the master database. This ensures that local data will not be overwritten. In above master-slave distributed database architecture, the master database node is trusted by all slave nodes as single entity own/control the system. Similarly, in multi-master distributed database architecture, all masters trust data passed by each other as single entity own/control the system. Whereas in our proposed decentralized database system architecture, each database node is owned/controlled by different entity and one entity may not trust another entity.

SUMMARY

In one example embodiment, provided is a computing system that includes one or more of a processor that may receive a database command from a client system, the database command including a function and parameters to be used by the function, and to execute the database command on database data, and an interface configured to transmit the database command to one or more other databases that are within a decentralized database system. In response to receiving a request from an ordering node of the decentralized database system, the processor may be further configured to commit results of executing the database command to a data store and store information about the database command in an append-only immutable database log.

In another example embodiment, provided is a method that includes one or more of receiving, by a processing device, a database command from a client system, the database command comprising a function and parameters to be used by the function, executing, by the processing device, the database command on database data, transmitting, by an interface, the received database command to one or more other databases that are within a decentralized database system, and in response to receiving a request from an ordering node of the decentralized database system, committing, by the processing device, results of executing the database command to a data store and storing information about the database command in an append-only immutable database log.

In another example embodiment, provided is a non-transitory computer readable medium having stored therein program instructions that when executed cause a computer to perform one or more of receiving, by a processing device, a database command from a client system, the database command comprising a function and parameters to be used by the function, executing, by the processing device, the database command on database data, transmitting, by an interface, the received database command to one or more other databases that are within a decentralized database system, and in response to receiving a request from an ordering node of the decentralized database system, committing, by the processing device, results of executing the database command to a data store and storing information about the database command in an append-only immutable database log.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

FIG. 2 is a diagram illustrating a communication sequence between devices in the distributed database system in accordance with an example embodiment.

FIGS. 3A-3B are diagrams illustrating a process of a database computing system processing a database command in accordance with an example embodiment.

DETAILED DESCRIPTION

Figure 1:
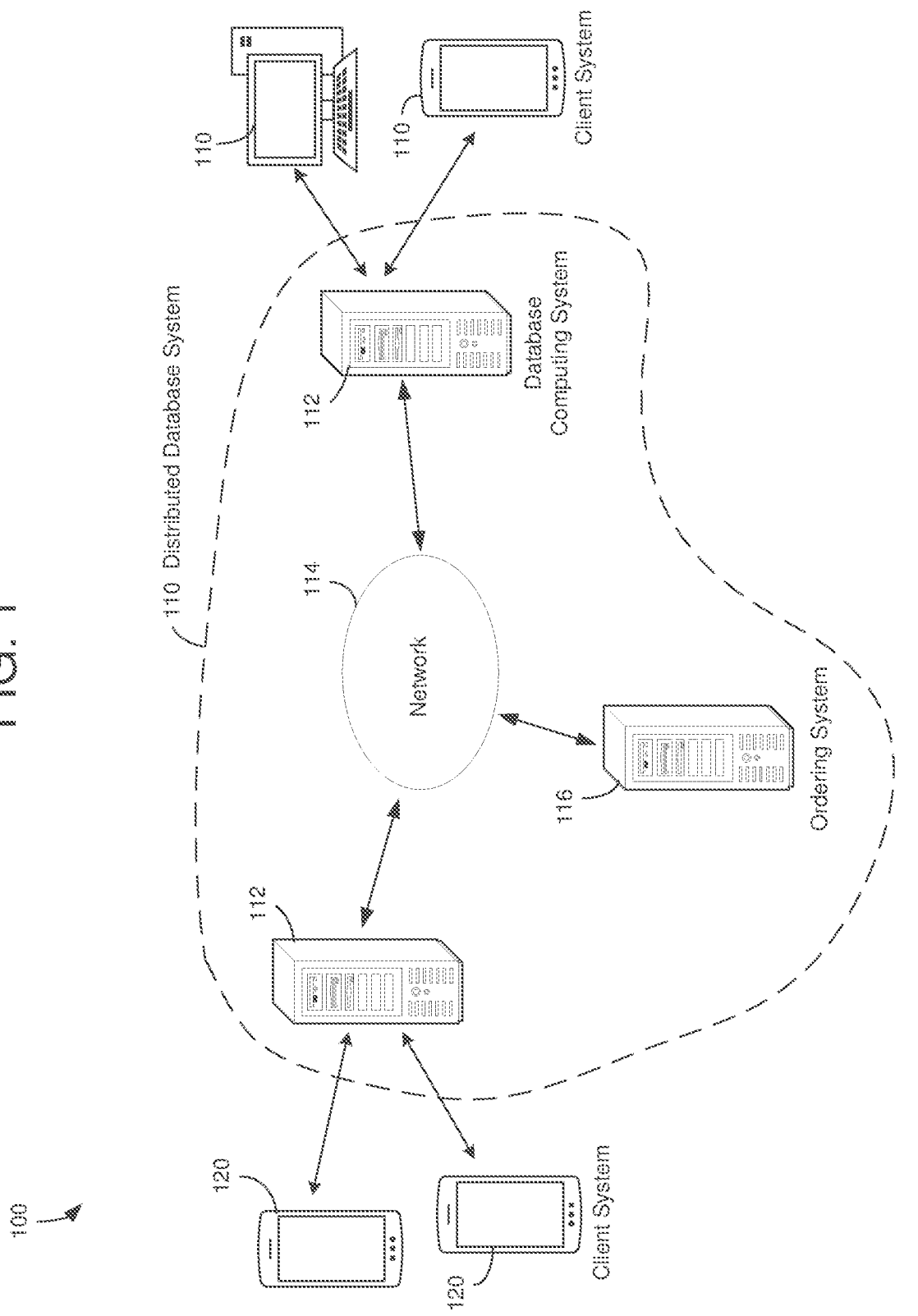
FIG. 1 is a diagram illustrating a distributed database system in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application in one embodiment relates to a decentralized database system, and in another embodiment relates to a decentralized database computing system that may include blockchain attributes that enhance the storage and security of the database while maintaining the ability of the database to process rich transactional database queries (e.g., SQL, DML, DDL, etc.) A blockchain system is often a heavy architecture that can consume too many resources. In many cases, a use case may only desire certain aspects of a blockchain without requiring all aspects to be implemented. The example embodiments provide a decentralized database system that can incrementally implement blockchain attributes and also provide each attribute to be turned on/off within the system through a simple setting change. As a result, a user may configure the level of blockchain attributes which the database supports.

There are similarities between a database system and a blockchain system. For example, the notion of smart contracts on a blockchain is similar to stored procedures on the database. Also, the notion of access control based on grants, roles, and row level security policies in a database system is also a feature that is permissioned in a blockchain system. However, there are many crucial differences between a database and the blockchain. For example, a blockchain system requires that a developer design smart contracts in certain programming languages. In contrast, even when blockchain properties are supported within a database, an application can still be written just as it would to interact with any database, while also having additional properties similar to a blockchain system. As a result, a new programming model does not need to be learned by a developer. Further, the database described herein allows for easy migration of traditional applications while leveraging blockchain capabilities and interacting with similar systems in other organizations for business.

Another difference is that blockchain systems do not allow support for rich queries or support for complex joins of multiple pieces of information performed by database systems. Supporting blockchain properties within a database, allows one to leverage rich query and transactional processing support (e.g., support for SQL queries, DML and DDL). The example embodiments improve database transaction/query performance because everything is handled within a database, rather than a blockchain system where everything is built on top of a database as independent processes/components (often duplicating what is already done within database). The types of databases used in the system may include relational and non-relational databases, though certain elements such as transactions and atomic operations may not be present in non-relational database implementations. The database may perform the traditional functions, though in a modified way, such as inserting/updating/deleting elements, querying at various levels of complexity (using SQL in case of relational database), etc.

Another difference is that in a distributed database system (such as master-slave and multi-master database system), data replicas among the database nodes may be 'trusted'. If one node in the distributed database sends a message to another node, the second node will fully trust the first node regarding the content and the origin of the message. According to various embodiments, this assumption within a database may be broken and a notion of security amongst the database replicas may be implemented, while leveraging existing replication capabilities within the database. As a result, a trusted distributed database system owned by a single entity becomes decentralized database system where each databased node can be owned by a different entity. A notion of consensus and total ordering of transactions may be implemented within the decentralized database system according to various aspects to ensure that all database nodes commit transactions in the same order (irrespective of transaction execution order) and full log of all transactions in the decentralized database system can be consistently maintained across all database nodes. These notions do not exist in a conventional distributed database.

Another aspect of the example embodiments is that by implementing these properties within a decentralized database, the properties can be configured incrementally through the use of settings included in a configuration file. For instance, if an application only needs 'immutability', the database can be configured to support just that without requiring multiple database nodes or a total order of transactions among database nodes or any complex cryptography. In contrast, by popular definition no blockchain system can exist without cryptographic security as the core property is decentralized trust.

FIG. 1 illustrates a network 100 which includes a decentralized database system 110 in accordance with an example embodiment. Referring to FIG. 1, the system 100 includes a decentralized group of database computing systems 112 (also referred to as nodes) which may communicate with one another and store a replica of database content which is subject to consensus among the nodes 112. The decentralized database system 110 may include one node or many nodes. The decentralized database system 110 also includes an ordering node 116 to ensure total ordering of transactions in a multi-node system. The database computing systems 112 may be connected to each other directly (e.g., via a USB interface, etc.) or through a network 114 (e.g., via a network interface), and the like. According to various embodiments, the decentralized database system 110 may be used to execute and record database queries which may be used to select, write, update, and interact with data stored in data stores of the decentralized database system 110. For example, client systems 120 (e.g., computers, tablets, mobile devices, POS terminals, software applications, etc.) may communicate with the nodes 112 via a network such as the Internet, a private network, or the like, and provide database commands to the database.

The database nodes 112 and the ordering node 116 may be database servers that store and control access to data. In this setting, the individual nodes may be controlled by different controlling entities. The database data may be fully replicated among all nodes 112. For example, each of the nodes 112 may maintain a copy of every database table, function, etc., in the database, though this replication can also be configured. The nodes may interact with one another following a detailed protocol setup in the system. For example, the nodes 112 may communicate new transactions to one another and each node may execute and obtain the result of each transaction. There are other such interactions between the node, such as for discovery, block transfer, etc.

According to various embodiments, the decentralized database system 110 may implement multiple blockchain properties. For example, the following blockchain features may be configured in the system 110:
1) Immutability and append only transactions,
2) Tamper-resistant hash chain ordered log of transactions maintained by all nodes,
3) Non-repudiability with signed transactions via membership service management and security built inside the database,
4) Control over replication (instead of full replication on all nodes there is control where data gets stored), and
5) Decentralized trust with support for multiple trust models through an ordering service component inside the database.

These blockchain attributes can be enabled/disabled via a database configuration file that is incorporated by the database computing systems 112. For example, the configuration file may add the following configurable blockchain properties to the database which can take either true/false or a name:
IMMUTABLE=true/false
TAMPER_PROOF_ORDERER=true/false
TAMPER_PROOF_TOTALLY_ORDERED=true/false
ORDERING_TRUST_MODEL=Practical Byzantine Fault Tolerance (PBFT)
NON_REPUDIABILITY=true/false As described herein, immutability and append only transactions refers to the process of database transactions that are created and added to a growing list of transactions, rather than only mutating the data in place. In traditional database systems, more importance is given to data and in the long run only the actual values of the data is focused on. In an immutable setting, however, data is only appended to a transactional log within the database thereby ensuring the preservation of the full history of the data and the commands used to manipulate and access the data. In a system with append only transactions, the record is given to the individual transactions (in some way, the deltas or changes happening to the data) that occur and these transaction entries cannot be changed.

To achieve this blockchain attribute within the database 110, a 'ledger' may be implemented (e.g., a database system table) which may be used to maintain the transaction logs of both committed and aborted transaction. During COMMIT/ABORT time, an entry may be made to the database transaction log. However, database commands such as insert, update, and delete are not allowed to be performed on the 'ledger' table by either a user or an admin and is implemented by modifying existing query processor engine. Instead, only COMMIT/ABORT function may be allowed to make entry in the transaction log. When user/admin enable immutable blockchain property, the above actions are enabled in the database system. Otherwise, the database system does not create and manage a 'ledger' system table to maintain immutable transaction logs.

A hash chained totally ordered log of transactions refers to a tamper-proof technique of storing entries in the log by storing a hash of every entry in the one following it. A classical log of transactions such as A, B, C is not tamper proof because later A may be replaced by D or the order may be changed (such as B, A, C). Instead, a hash chained totally ordered log is more like:
E1=A
E2=B, H(E1)
E3=C, H(E2)
where each next entry in the log has a reference to the previous entry and so on and so forth. Such a database log, maintained at multiple independent database nodes (in a decentralized database system), provides auditable trail of transactions because the entries can be signed and time-stamped by each node as well. Instead of just storing the transaction on 'ledger' system table, the transactions may be linked to one another using hash chains and stored onto 'ledger' table in the order of COMMIT/ABORT in the database node. This property provides the order in which the transactions are committed/aborted.

There is also a feature of "totally" ordered log of transactions. The totally ordered blockchain property is enabled when multiple database nodes are participating in the decentralized database system. As transactions can be submitted to different database nodes in different orders, this blockchain property ensures that all database nodes in the system are committing/aborting the same set of transactions in the same order. As a result, the 'ledger' system table in all database nodes will have the same ordered hash chain of transactions which are either committed or aborted. To ensure the same order on all nodes, the ordering service (e.g., ordering node 116) can perform either trusted centralized ordering or decentralized trusted consensus based ordering.

A membership service management system may be implemented to control all access/participation in the database system. Hence all interaction in the system may be performed only by members/parties properly authorized and authenticated by this membership management module. Non-repudiation is a property which can be stated as follows. No party P may perform an action A and later be able to claim that they did not, in fact, perform action A. Because the system can prove occurrence of all actions/interactions, then non-repudiation is guaranteed. Signed transactions may include a transaction (the primary way of interacting with the system) is cryptographically signed by the issuers (e.g., client system) under the purview of the membership service management system. Traditionally, databases have always provides roles and permissions associated with roles. Thus, by using a membership service management system built into the database and using signatures to control interaction, non-repudiation may be provided. To achieve non-repudiation, a cryptography module may be implanted in a query processor engine of the database node which verifies whether the right entity (who has submitted this transaction) has signed the transaction. If not, the database node may not process the transaction. Also in the 'ledger' system table, the signature which was put on the transaction by the submitting entity may be added by the database node.

Transactions in this context, are more or less, the only way to interact with the system. Each transaction logic can be written as a stored procedure and agreed by all entities participating in the blockchain network. Transactions may create new tables, add or update rows in tables, delete data or be a query to bring out specific patterns. Various parties interacting with the system may be restricted to operating on resources/data only meant to be accessed by them. In the database system, access control (using grants, roles, and row level security policies) on transactions provides this feature. Note that traditional databases already have some form of access control built in. This can be improved upon to achieve access control on transactions.

Replicated systems come with varying degrees of replication. Blockchain systems are usually fully replicated, meaning each unit of resource/data resides on all participating nodes/entities. All nodes have a full copy of the underlying data or ledger. However, traditional database systems usually use a low degree of replication. Every unit of data may be present as two independent copies (such as in a hot standby setup) or three independent copies (such as in usual Hadoop setups) etc. Replication in these settings is done from a backup or safety (avoiding a Single Point of Failure) standpoint. In the blockchain setting, it is more from a tamper proof or trust (how do you trust a small number entities controlling the data) standpoint. Depending on the application and trust assumptions, exact control on the degree of replication may be performed.

The trust model described herein refers to the assumptions on the trustworthiness of the various participants in the system. This usually pertains to the nodes performing various duties within the system, usually owned by separate entities in terms of control. One of the functions of the database system is to provide consensus where multiple database nodes come to agreement about the shared data/resources. The ordering service component (e.g., ordering node 116) within the system can help decentralize trust and be configured to work under varying trust models. For instance, when the participants trust one another due to whatever reasons, a single node providing the ordering is the most simple and performant option. As another example, the nodes may trust each other to not act maliciously, but may still like some crash resistant ordering. In yet another example, nodes may not trust each other and a different ordering service can be used. In case the trust model is such that some nodes are trusted more than other, a relevant ordering service component may be used that best suits the needs of the system.

FIG. 2 illustrates a communication sequence 200 between devices in a decentralized database system in accordance with an example embodiment. Referring to FIG. 2, the decentralized database includes a plurality of database nodes 221-223 and an ordering system 230. Any one of the database nodes (e.g., database node 221) may receive a database query from a client system 210 which may be issued by a software program, or the like, which is included in the client system 210. In step 241, the client system 210 invokes a database command/function at the database node 221. In response, the database node 221 may execute the function (e.g., using serializable snapshot isolation) but not commit the results of the execution. Rather, as a non-limiting example, the results may be stored in a temporary storage space, or the like. Furthermore, in 242, the database node 221 may acknowledge receipt of the database command. The database command may include one or more SQL commands, one or more DML commands, one or more DDL commands, or the like. Database commands include functions such as reading, selecting, writing, updating, and the like. The database commands also include parameters which may be used to identify data that is to be processed by the command. To ensure that execution of a transaction on multiple nodes results in a same output, the client system (which issues the transaction) provides a snapshot id (refers to a data snapshot) which can be used by all database nodes. The client system retrieves the latest snapshot id from any one of the nodes before issuing the transaction so that it can add the snapshot id in the transaction message.

Next, the database command may be forwarded to the other database nodes in the decentralized database (i.e., database nodes 222 and 223) in steps 243 and 244. Each of the database nodes may execute to the database command on database data under snapshot isolation (e.g., using the snapshot id in the transaction message) but not yet commit the results, just as the first database node 221. In 245, the database node 221 may also transmit the database command to an ordering service (i.e., ordering node 230) which may be included within one of the database nodes or it may be a separate node/service. For convenience, the ordering node 230 is shown as a separate node in the example of FIG. 2.

Depending on whether the decentralized database implements a trusted network or an untrusted network will dictate how the ordering node 230 determines whether to commit the transaction. In the untrusted network, the ordering node 230 may receive all transactions, verify the signatures of the client systems submitting the transactions, and construct a block for database storage by employing a trusted service. Here, the ordering node 230 may process database commands in batches (rather than a single command at a time) to improve system efficiency. Accordingly, the block that is created may include multiple transactions and data/information of each transaction.

In the untrusted environment, the ordering node 230 may add the signatures to the block and broadcast the block to all the database nodes in the distributed database system, in 246. On receiving the block, each of the database nodes 221-223 may verify the signature and perform a serializability check to decide whether to commit/abort the transaction. If the transaction has not yet been received from the client or other nodes, the node executes the transaction and can then commit/abort. Each database node commits the transaction to its own data store in the same order (not necessarily the same time). Also, regardless of whether the transaction was committed/aborted, the database node stores the block received from the ordering node within the immutable database transaction log which is an append-only record of the transactions within the distributed database system. The block includes specifics of each transaction processed during this batch. In addition, the database node may also store information about the ordering node that generated the block, the client/signature that provided the initial database command to the distributed database, and the like, within the append-only database log. Note that each block can have a sequentially increased block number and the snapshot id in transaction message issued by client system denotes a block number. As a result, a snapshot id of 10 denotes a data snapshot (a set of tables and rows) which contains all rows which are created or modified by all transactions presents in the block 1 to 10. If a transaction in block 10 deletes a row created by transaction in block 5, that row is not visible in snapshot id 10. Before a commit, a serializability check can be performed to identify any newly committed block which is greater than transaction's snapshot id results in phantom read. If the serializability check fails, the transaction is aborted.

As another example, the ordering node 230 may operate in a trusted environment. In this situation, the signature does not need to be added or verified. Rather, the ordering node 230 may receive the database command in 245, construct the block, and broadcast the block to all database nodes in 246. On receiving the block in this example, each database node may perform a serializability check to decide whether to commit/abort the transaction. Also, the database nodes may store the block along with additional information about the ordering node and the client that issued the database command with the immutable database transaction log.

Figure 3B:
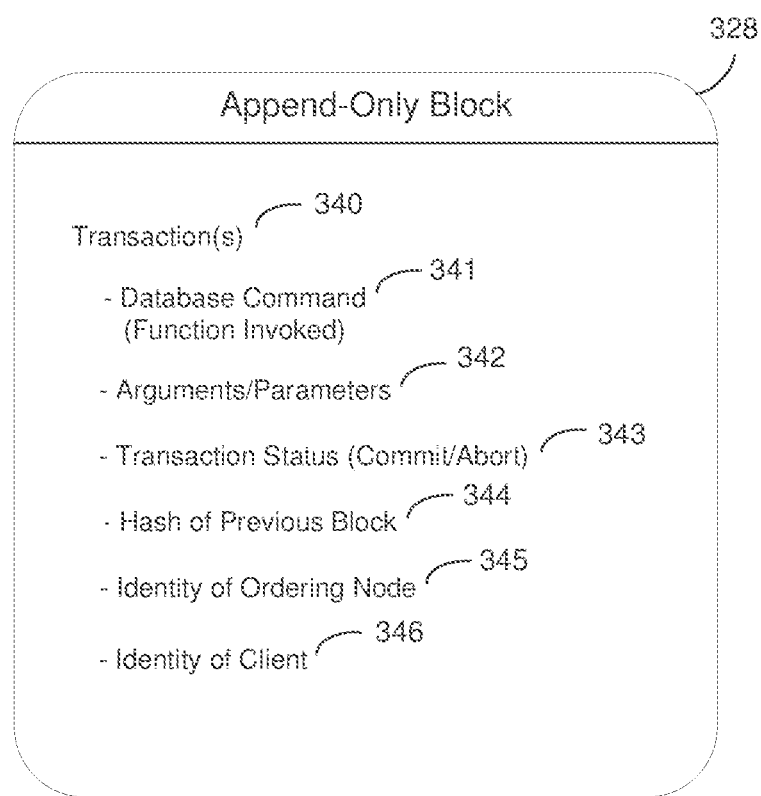

FIG. 3A illustrates a process 300 of a database computing node 320 processing a database command, and FIG. 3B illustrates contents of a data block 328 that is stored in an immutable append-only database log, in accordance with example embodiments. Referring to FIG. 3A, the database computing node 320 includes a processor 322, a temporary memory area 324 (e.g., private workspace, cache, RAM, etc.), a data store 326, and an append-only database log 328. In 310, the processor 322 receives a database command from a client system or another database node, and in response, executes the database command. The results of executing the database command, however, may not be committed to the data store 326 but may be stored in temporary memory 324, in 311.

In 312, the database node 320 may forward the database command to another database node or an ordering node that is also included in the decentralized database system. Also, in 312, the database node 320 may receive a commit request including a block of transactional data from the ordering node. Here, the processor 322 may execute a read-set version check on each executed transaction by constructing a dependency graph to decide whether to commit/abort the transaction. If the transaction has not yet been received from the client or other nodes, the processor 322 may commit the transaction to the data store 326, in 313. Furthermore, the processor 322 may store the block received from the ordering node within the immutable append-only database transaction log 328, in 314. The block includes specifics of each transaction processed during which may be a batch of transactions. In addition, the processor 322 may also store information about the ordering node that generated the block, the client/signature that provided the initial database command to the decentralized database, and the like, within the append-only database log 328.

The contents of the block information that may be stored in the append-only database log 328 is shown in FIG. 3B. Referring to FIG. 3B, as a non-limiting example, the block stored in the append-only database log 328 may include one or more transactions 340 which are to be committed/processed by the database node. For each transaction 340, the block may store a database command 341 (e.g., SQL command, function, etc.), arguments passed 342 to the command (e.g., variable, database location, etc.), a transaction status of the transaction (e.g., commit/abort) 343, a hash of a previous block in the database log 344, an identity of the ordering node 345, and an identity of the client 346 that initially issued the database command, a signature of the client that transmitted the transaction message, and a signature of an orderer on the whole block content.

Figure 4:
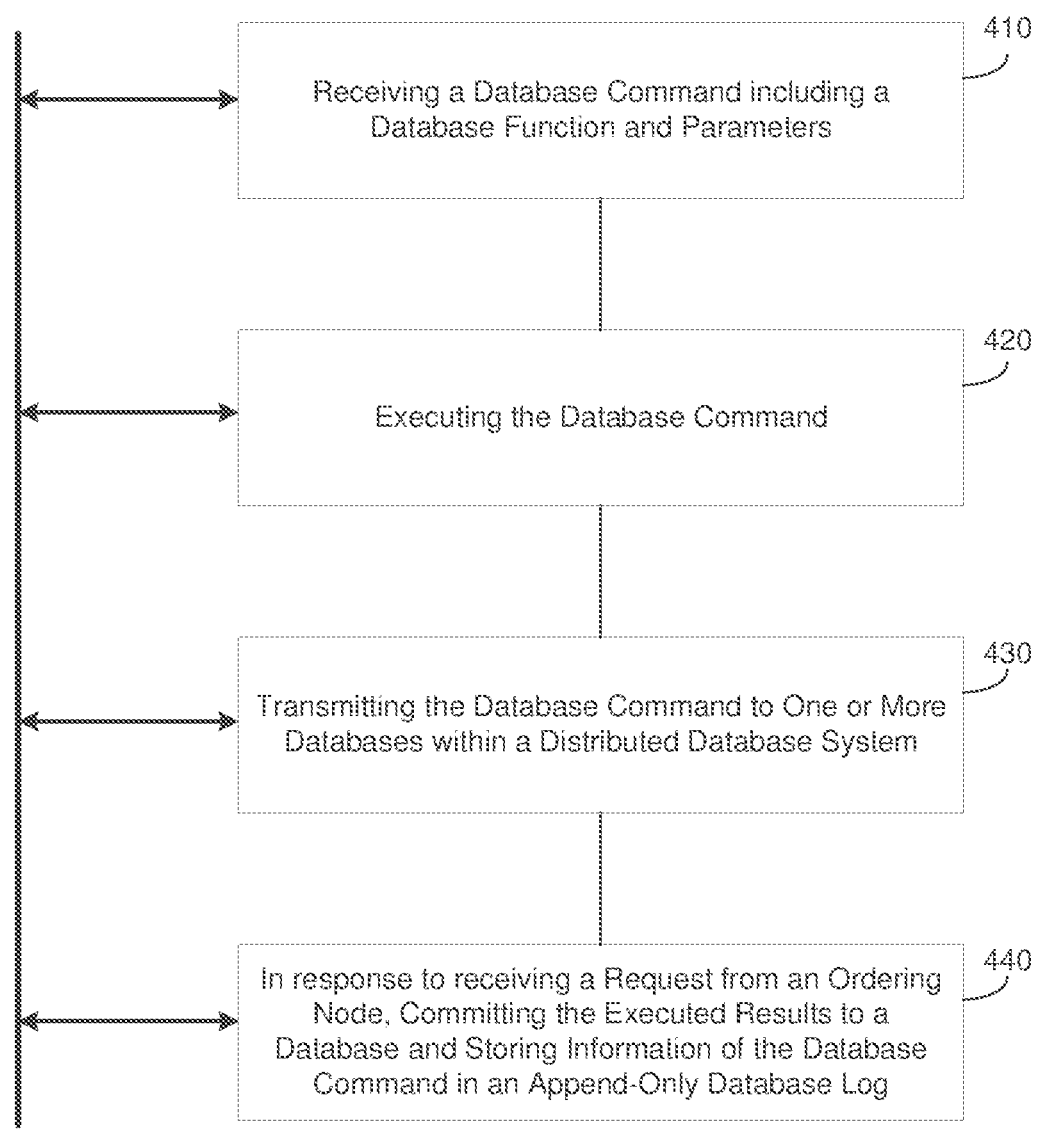
FIG. 4 is a diagram illustrating a method for processing a database command in a distributed database system in accordance with an example embodiment.

FIG. 4 illustrates a method 400 for processing a database command in a decentralized database system in accordance with an example embodiment. For example, the method 400 may be performed by a computing system such as a database computing system included in a decentralized database system. Here, the computing system may include a server, a cloud platform, a workstation computer, a user device, and the like. In 410, the method includes receiving, by a processing device, a database command from a client system, the database command including a function and parameters to be used by the database function. For example, the database command may include an SQL command, a DML command, a DDL command, and the like. Functions of SQL commands may include standard functions including select, read, update, count, average, min, max, sum, and the like, as well as custom-designed functions. The parameters may include data that is passed to or processed as a result of the database command. Examples of parameters include locations in the database (e.g., start location, end location, columns, rows, tables, etc.), data values, table names, and the like. It should be appreciated that the database computing system may be a relational database system or a non-relational database system.

In 420, the method includes executing, by the processing device, the database command on database data. For example, the database computing system may execute the database command using serializable snapshot isolation with a client supplied snapshot id within the database to enable a consistent view of the database throughout the process. In 430, the method further includes transmitting, by an interface, the received database command to one or more other databases that are within a decentralized database system. For example, the database command may be forwarded to one or more other database computing systems (i.e., nodes) within the decentralized database system, an ordering node (which may be included in a database computing system or in a different entity), and the like.

In response to receiving a request from an ordering node of the decentralized database system, in 440 the method includes committing, by the processing device, results of executing the database command to a respective data store of the database system and storing information about the database command in an append-only immutable database log. The process of committing the executed results may be performed in response to receiving a broadcast signal from the ordering node which is transmitted to all database nodes within the decentralized database computing system. As a result, the database nodes can update their respective data stores to reflect the most recent transaction on the database. Prior to storing the database command information in the immutable transaction log, the method may include determining to store the information about the database command in the append-only immutable database log based on a setting in a configuration file of the database computing system.

In some embodiments, the storing the information about the database command in the append-only immutable database log may include storing the information about the database command in an append-only immutable system table of the database. In some embodiments, the storing the information about the database command in the append-only immutable database log may include storing a received block which includes the database command and arguments passed to the database command, an identity of an ordering service that created the block, an identity of a client that issued the database command, and the like. In some embodiments, the storing the information about the database command may further include storing a hash of a previous entry on the append-only immutable database log with the information about the database command to generate a hash chained ordered immutable database log. In some embodiments, the committing the results and the storing the information about the database command may be performed in response to verifying that a client that initially submitted the database command has signed the database command with a valid certificate.

The example embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
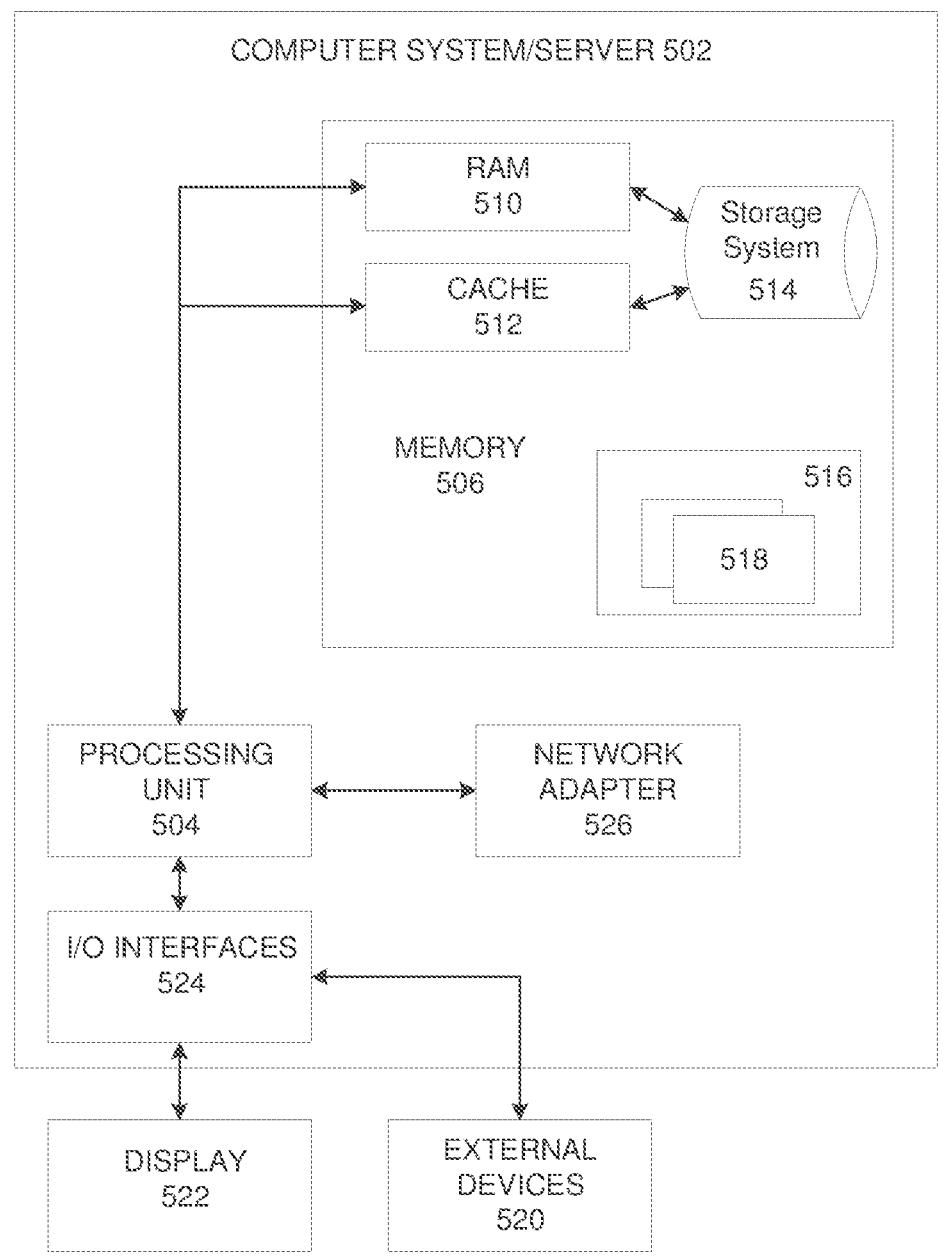
FIG. 5 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc. The computer system 500 may be a single device or a combination of devices. For example, the computer system 500 may be a database computing system, a server, a cloud instance, and the like.

FIG. 5 is not intended to suggest any limitation as to the scope of use or functionality of embodiments of the application described herein. Regardless, the computing system 500 (or node 500) is capable of being implemented and/or performing any of the functionality set forth hereinabove.

In computing node 500 there is a computer system/server 502, which is operational with numerous other general purpose or special purpose computing system environments or configurations. Examples of computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed database computing system, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in computing node 500 is shown in the form of a general-purpose computing device. The components of computer system/server 502 may include, but are not limited to, one or more processors or processing units 504 (i.e., processors), a system memory 506, and a bus that couples various system components including system memory 506 to processor 504. The computing node 500 may be a database computing system 112 as shown in FIG. 1 or another computing system, device, etc. or combination of devices such as a combination of a server, cloud platform, database, and/or the like. Also, the computing node 500 may perform the method 400 shown in FIG. 4.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. As another example, the system memory 506 may include a data store where database tables are stored. The database may be a relational database format, a non-relational database format, or the like.

Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit,"

"module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526 (also referred to as a network interface). As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

According to various embodiments, the processor 504 may receive a database command from a client system. The database command may include a database function and parameters to be used by the database function. Examples of database commands include SQL commands/functions such as delete, select, join, insert, etc. There is no limit to the type of commands that can be performed on the database. In addition, the processor 504 may execute the database command on the database data based on the parameters. For example, the database command may be executed under snapshot isolation to maintain the database contents. However, rather than commit the results of executing the database command, the processor 504 may wait until the database command has been distributed throughout the rest of the database nodes included in the decentralized database system.

Furthermore, the network interface 526 via a network (or another interface such as USB, cable, etc. via a direct connection or the like) may transmit the database command to one or more other databases that are within the decentralized database system. Furthermore, in response to receiving a request from an ordering node of the decentralized database system, the processor 504 may commit results of executing the database command to a data store and also record/store information about the database command and the parameters in an append-only immutable database log. The append-only immutable database log acts as an immutable ledger for database commands and can be maintained by all database nodes within the decentralized database system. For example, the append-only immutable database log may be included in a system table of the database computing system. Each database node in the decentralized database may maintain its own append-only database log.

In some embodiments, the network interface 526 may receive a block including an identification of the database command and arguments passed to the database command, from an ordering node. In addition, the block may include an identity of an ordering node that created the block, an identity of a client that issued the database command, and the like. The block may be stored in the append-only immutable database log. In some embodiments, the processor 504 may store a hash of a previous entry of the append-only immutable database log together with the information about the database command (e.g., within the block) to generate a hash chained ordered immutable database log. The hash may be received from the ordering node or it may be created by the database computing system. In some embodiments, the processor 504 may commit the execution results of the database command and the store the information about the database command in the append-only database log in response to verifying that a client that initially submitted the database command has signed the database command with a valid certificate. In some embodiments, the processor 504 may further determine to store the information about the database command in the append-only immutable database log based on a setting in a configuration file of the database computing system.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a decentralized architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and decentralized forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. A database computing system comprising:
a processor configured to receive a database command with a block identifier from a client, execute the database command which modifies data in its existing location within a database, and store the execution results in a temporary storage; and
an interface configured to transmit the database command including the block identifier to one or more other database nodes that are within a decentralized database system,
wherein the processor is further configured to determine that a block with an identifier greater than the block identifier of the database command has not been committed, generate a record comprising an identification of the database command and an identifier of a data parameter previously stored in the database that is passed to the database command, and store the record in a block of an append-only database log.

2. The database computing system of claim 1, wherein the database command comprises a structure query language (SQL) command and an identification of an existing location of the data in the database which is passed to the SQL command.

3. The database computing system of claim 1, wherein the processor is configured to execute the database command under a serializable snapshot isolation in the database based on the block identifier.

4. The database computing system of claim 1, wherein the processor is configured to store information about the database command in an append-only system table of the database.

5. The database computing system of claim 1, wherein the database command comprises a join operation between two pieces of data within one or more database tables of the database.

6. The database computing system of claim 1, wherein the processor is further configured to store a hash of a previous entry of the append-only immutable database log together with information about the database command to generate a hash chained ordered immutable database log.

7. The database computing system of claim 1, wherein the processor is configured to commit results of executing the database command to a data store and store the record of the database command in the append-only immutable database log, in response to verifying that a client that initially submitted the database command has signed the database command with a valid certificate.

8. The database computing system of claim 1, wherein the processor is configured to generate and store the record in the append-only immutable database log in response to an activation setting being set to enabled in a configuration file of the database computing system.

9. The database computing system of claim 1, wherein the database command modifies the data parameter that is passed to the database command and stores the modified data parameter at an existing table within the database where the data parameter is previously stored.

10. A computer-implemented method comprising:
receiving a database command with a block identifier from a client;
executing, by a processing device, the database command which modifies data in its existing location within a database and storing the execution results in a temporary storage;
transmitting, by an interface, the database command including the block identifier to one or more other database nodes that are within a decentralized database system;
determining that a block with an identifier greater than the block identifier of the database command has not been committed; and
generating, by the processing device, a record comprising an identification of the database command and an identifier of a data parameter previously stored in the database that is passed to the database command, and storing the record in a block of an append-only database log.

11. The computer-implemented method of claim 10, wherein the database command comprises a structure query language (SQL) command and an identification of an existing location of the data in the database which is passed to the SQL command.

12. The computer-implemented method of claim 10, wherein the executing the database command is performed under a serializable snapshot isolation in the database based on the block identifier.

13. The computer-implemented method of claim 10, wherein the storing further comprises storing information about the database command in an append-only system table of the database.

14. The computer-implemented method of claim 10, wherein the database command comprises a join operation between two pieces of data within one or more database tables of the database.

15. The computer-implemented method of claim 10, wherein the storing further comprises storing a hash of a previous entry on the append-only immutable database log with information about the database command to generate a hash chained ordered immutable database log.

16. The computer-implemented method of claim 10, further comprising committing results of executing the database command in a data store and storing the record of the database command in the append-only immutable database log, in response to verifying that a client that initially submitted the database command has signed the database command with a valid certificate.

17. The computer-implemented method of claim 10, wherein the generating further comprises generating and storing the record in the append-only database log in response to an activation setting being set to enabled in a configuration file of the database computing system.

18. A non-transitory computer readable medium having stored therein program instructions that when executed cause a computer to perform a method comprising:
  receiving a database command with a block identifier from a client;
  executing, by a processing device, the database command which modifies data in its existing location within a database and storing the execution results in a temporary storage;
  transmitting, by an interface, the database command including the block identifier to one or more other database nodes that are within a decentralized database system;
  determining that a block with an identifier greater than the block identifier of the database command has not been committed; and
  generating, by the processing device, a record comprising an identification of the database command and an identifier of a data parameter previously stored in the database that is passed to the database command, and storing the record in a block of an append-only database log.

19. The non-transitory computer readable medium of claim 18, wherein the database command comprises a structure query language (SQL) command and an identification of an existing location of the data in the database which is passed to the SQL command.

20. The non-transitory computer readable medium of claim 18, wherein the executing the database command is performed under a serializable snapshot isolation in the database based on the block identifier.

21. The non-transitory computer readable medium of claim 18, wherein the storing comprises storing information about the database command in an append-only system table of the database.

* * * * *